US009521413B2

(12) United States Patent
Pahalawatta et al.

(10) Patent No.: US 9,521,413 B2
(45) Date of Patent: Dec. 13, 2016

(54) OPTIMIZED FILTER SELECTION FOR REFERENCE PICTURE PROCESSING

(71) Applicant: DOLBY LABORATORIES LICENSING CORPORATION, San Francisco, CA (US)

(72) Inventors: Peshala V. Pahalawatta, Glendale, CA (US); Yuwen He, San Diego, CA (US); Alexandros Tourapis, Los Gatos, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 15/004,582

(22) Filed: Jan. 22, 2016

(65) Prior Publication Data

US 2016/0142709 A1 May 19, 2016

Related U.S. Application Data

(63) Continuation of application No. 13/877,140, filed as application No. PCT/US2011/052210 on Sep. 19, 2011, now Pat. No. 9,270,871.

(Continued)

(51) Int. Cl.
*H04N 7/12* (2006.01)
*H04N 19/117* (2014.01)
(Continued)

(52) U.S. Cl.
CPC .............. *H04N 19/117* (2014.11); *H04N 5/21* (2013.01); *H04N 19/147* (2014.11);
(Continued)

(58) Field of Classification Search
CPC .................................................... H04N 19/117
See application file for complete search history.

(56) References Cited

U.S. PATENT DOCUMENTS 4,580,275 A * 4/1986 Pirani ............... H04L 25/03038 375/232
6,453,069 B1 * 9/2002 Matsugu .................. G06K 9/48 382/173

(Continued)

FOREIGN PATENT DOCUMENTS

| | | |
|---|---|---|
| CN | 1493157 | 4/2004 |
| CN | 101589625 | 11/2009 |

(Continued)

OTHER PUBLICATIONS

Kim, Jae Hoon et al. "New Coding Tools for Illumination and Focus Mismatch Compensation in Multiview Video Coding" IEEE Transactions on Circuits and Systems for Video Technology, IEEE Service Center, Piscataway, NJ, US, vol. 17, No. 11, Nov. 1, 2007, pp. 1519-1535.

(Continued)

*Primary Examiner* — Tracy Y Li

(57) ABSTRACT

Reference processing may be used in a video encoder or decoder to derive reference pictures that are better correlated with a source image to be encoded or decoded, which generally yields better coding efficiency. Methods for filter selection for a reference processing unit adapted for use in a video codec system are discussed. Specifically, methods for filter selection based on performing motion estimation and obtaining distortion/cost information by comparing reference pictures, either processed or non-processed, with the source image to be encoded are discussed.

15 Claims, 9 Drawing Sheets

Related U.S. Application Data

(60) Provisional application No. 61/389,180, filed on Oct. 1, 2010.

(51) Int. Cl.

| | |
|---|---|
| ***H04N 5/21*** | (2006.01) |
| ***H04N 19/597*** | (2014.01) |
| ***H04N 19/176*** | (2014.01) |
| ***H04N 19/147*** | (2014.01) |
| ***H04N 19/39*** | (2014.01) |
| ***H04N 19/82*** | (2014.01) |
| ***H04N 19/52*** | (2014.01) |

(52) U.S. Cl.

CPC .......... *H04N 19/176* (2014.11); *H04N 19/39* (2014.11); *H04N 19/52* (2014.11); *H04N 19/597* (2014.11); *H04N 19/82* (2014.11)

(56) References Cited

U.S. PATENT DOCUMENTS

| | | | | |
|---|---|---|---|---|
| 9,078,008 | B2 | 7/2015 | Ye | |
| 2004/0179620 | A1* | 9/2004 | Foo | H04N 19/513 375/240.27 |
| 2006/0146941 | A1 | 7/2006 | Cha | |
| 2007/0064802 | A1* | 3/2007 | Paniconi | H04N 19/51 375/240.16 |
| 2008/0089417 | A1* | 4/2008 | Bao | H04N 19/176 375/240.16 |
| 2009/0129465 | A1* | 5/2009 | Lai | H04N 19/597 375/240.02 |
| 2009/0190662 | A1* | 7/2009 | Park | H04N 19/597 375/240.16 |
| 2009/0274216 | A1* | 11/2009 | Kato | H04N 19/147 375/240.16 |
| 2009/0290637 | A1* | 11/2009 | Lai | H04N 19/597 375/240.02 |
| 2010/0002770 | A1 | 1/2010 | Motta | |
| 2010/0034273 | A1* | 2/2010 | Xia | H04N 19/00781 375/240.16 |
| 2010/0232510 | A1* | 9/2010 | Ho | H04N 19/597 375/240.16 |
| 2011/0243231 | A1 | 10/2011 | Li | |
| 2011/0286526 | A1* | 11/2011 | Nakagami | H04N 19/513 375/240.16 |
| 2012/0026288 | A1 | 2/2012 | Tourapis | |
| 2012/0092452 | A1 | 4/2012 | Tourapis | |
| 2013/0136371 | A1 | 5/2013 | Ikai | |

FOREIGN PATENT DOCUMENTS

| | | |
|---|---|---|
| EP | 1720358 | 11/2006 |
| JP | 2006-295913 | 10/2006 |
| JP | 2010-507961 | 3/2010 |
| JP | 5235035 | 2/2012 |
| JP | 2012-516657 | 7/2012 |
| JP | 2012-521734 | 9/2012 |
| JP | 2013-518465 | 5/2013 |
| JP | 2013-534117 | 8/2013 |
| JP | 2013-535901 | 9/2013 |
| JP | 2013-538487 | 10/2013 |
| JP | 2013-542648 | 11/2013 |
| WO | 2010/075348 | 7/2010 |

OTHER PUBLICATIONS

T-REC-H264 “Advanced Video Coding for Generic Audiovisual Services” Mar. 2010.

Tourapis, A.M et al. “A Frame Compatible System for 3D Delivery” MPEG Meeting, Motion Picture Expert Group or ISO/IEC JTC 1, Jul. 30, 2010.

* cited by examiner

OPTIMIZED FILTER SELECTION FOR REFERENCE PICTURE PROCESSING

CROSS REFERENCE TO RELATED APPLICATIONS

This Application is a continuation application claiming priority to U.S. patent application Ser. No. 13/877,140 filed Mar. 29, 2013, which claims priority to International Patent Application No. PCT/US2011/052210 filed Sep. 19, 2011, which claims priority to U.S. Provisional Patent Application No. 61/389,180 filed 1 Oct. 2010. The present application may be related to U.S. Provisional Application No. 61/170,995, filed on Apr. 20, 2009, U.S. Provisional Application No. 61/223,027, filed on Jul. 4, 2009, U.S. Provisional Application No. 61/300,427, filed on Feb. 1, 2010, all of which are incorporated herein by reference in their entirety.

TECHNOLOGY

The present invention relates generally to video processing. More specifically, an embodiment of the present invention relates to optimized reference processing filter selection methods.

BACKGROUND

Multi-layered video codecs provide, for instance, scalability in spatial and temporal resolution, bit-depth, color gamut, and quality. A number of multi-layered video codecs has been standardized by the video coding community. Among the standardized multi-layered video codecs are the Multiview Video Coding extension (MVC) and the Scalable Video Coding (SVC) extension of the MPEG-4 AVC/H.264 standard. An exemplary reference that introduces the H.264 standard can be found in "Advanced video coding for generic audiovisual services", http://www.itu.int/rec/T-REC-H.264/e, dated March 2010, which is incorporated herein by reference in its entirety.

DETAILED DESCRIPTION

Figure 1:
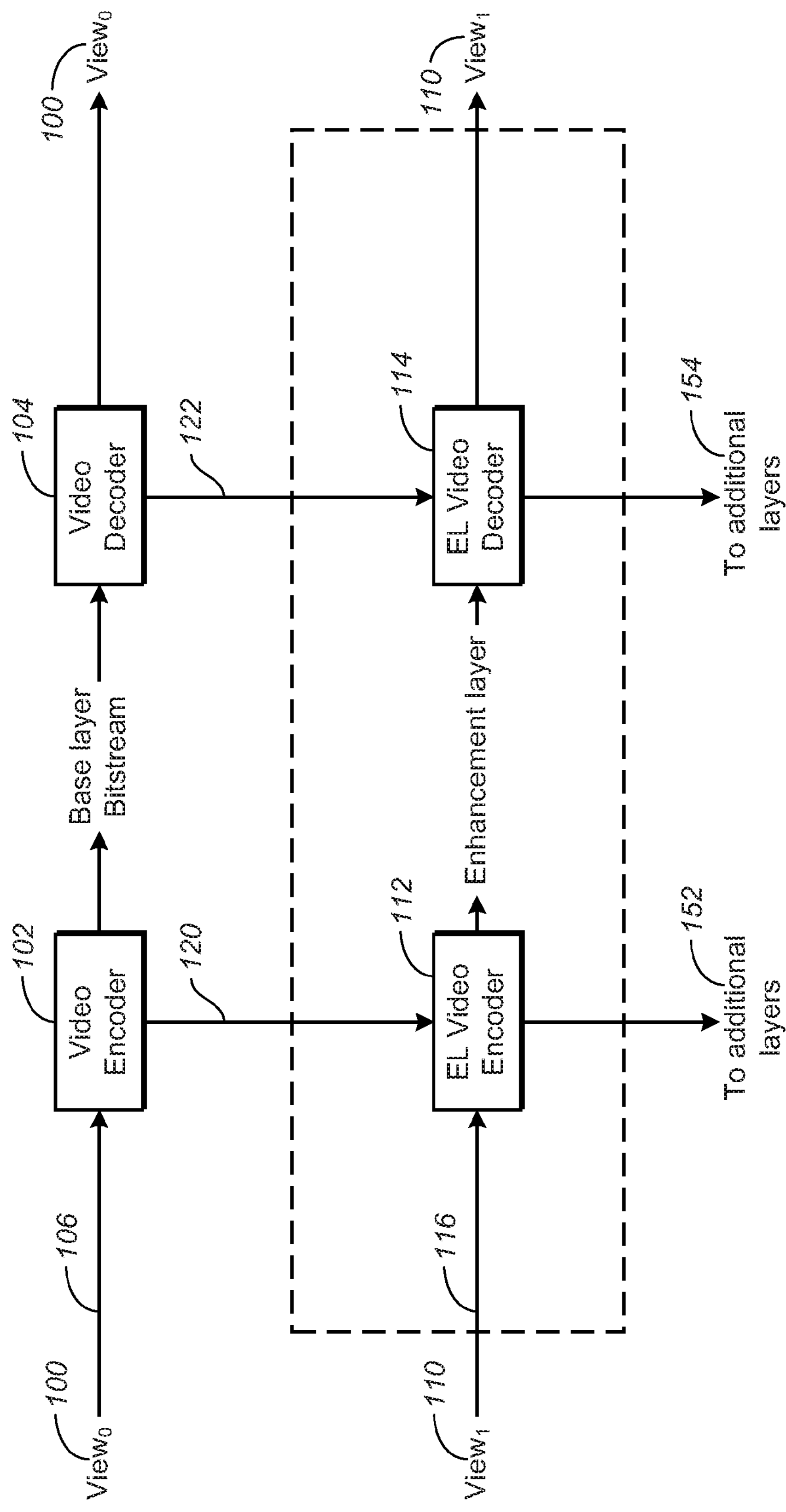
FIG. 1 shows an implementation of a multi-layered video codec system.

According to a first aspect of the disclosure, a method for selecting a particular filter from among a plurality of filters, the particular filter adapted for use in a reference picture processing unit in a multi-layered video coding system, the multi-layered video coding system comprising a base layer and one or more enhancement layers is provided, the method comprising: a) providing a reference picture and an enhancement layer source picture; b) filtering copies of the reference picture using at least one filter from the plurality of filters to obtain at least one filtered reference picture, wherein each filter is applied to a corresponding copy of the reference picture; c) performing disparity estimation based on the enhancement layer source picture and a full set or subset of the at least one filtered reference picture, wherein the disparity estimation is adapted to generate disparity information; and d) selecting the particular filter based on comparing the disparity information generated in step c), wherein the disparity information is a function of at least one of motion vectors, prediction distortion, intra prediction information, illumination parameters, luma components, chroma components, and tone mapping parameters.

According to a second embodiment of the disclosure, a method for selecting a particular filter from among a plurality of filters, the particular filter adapted for use in a reference picture processing unit in a multi-layered video coding system, the multi-layered video coding system comprising a base layer and one or more enhancement layers is provided, the method comprising: a) providing a reference picture and an enhancement layer source picture; b) filtering copies of the reference picture using at least one filter from the plurality of filters to obtain at least one filtered reference picture, wherein each filter is applied to a corresponding copy of the reference picture; c) performing disparity estimation based on the enhancement layer source picture and a full set or subset of the at least one filtered reference picture, wherein the disparity estimation is adapted to generate disparity information; d) obtaining distortion information based on the disparity information; and e) selecting the particular filter based on comparing the distortion information generated in step d), wherein the disparity information is a function of at least one of motion vectors, prediction distortion, intra prediction information, illumination parameters, luma components, chroma components, and tone mapping parameters.

According to a third embodiment of the disclosure, a method for selecting a particular filter from among a plurality of filters, the particular filter adapted for use in a reference picture processing unit in a multi-layered video coding system, the multi-layered video coding system comprising a base layer and one or more enhancement layers is provided, the method comprising: a) providing an enhancement layer source picture; b) performing disparity estimation based on the enhancement layer source picture and motion information from a particular layer, wherein the disparity estimation is adapted to generate disparity information; c) obtaining distortion information based on the enhancement layer source picture and the motion information from the particular layer; and d) selecting the particular filter based on comparing the distortion information acquired in step c), wherein the disparity information is a function of at least one of motion vectors, prediction distortion, intra prediction information, illumination parameters, luma components, chroma components, and tone mapping parameters, and wherein the motion information from the particular layer is based on temporal reference pictures of the particular layer.

According to a fourth embodiment of the disclosure, a method for selecting a particular filter from among a plurality of filters, the particular filter adapted for use in a reference picture processing unit in a multi-layered video coding system, the multi-layered video coding system comprising a base layer and one or more enhancement layers is provided, the method comprising: a) providing a reference picture and an enhancement layer source picture; b) filtering copies of the reference picture using at least one filter from the plurality of filters to obtain at least one filtered reference picture, wherein each filter is applied to a corresponding copy of the reference picture; c) performing disparity estimation based on the enhancement layer source picture, a full set or subset of the at least one filtered reference picture, and motion information from a particular layer, wherein the disparity estimation is adapted to generate disparity information; d) obtaining distortion information based on the enhancement layer source picture, the full set or subset of the at least one filtered reference picture, and motion information from the particular layer; and e) selecting the particular filter based on comparing the distortion information acquired in step d), wherein the disparity information is a function of at least one of motion vectors, prediction distortion, intra prediction information, illumination parameters, luma components, chroma components, and tone mapping parameters, and wherein the motion information is based on temporal reference pictures of the particular layer.

According to a fifth embodiment of the disclosure, a method for selecting a particular filter from among a plurality of filters, the particular filter adapted for use in a reference picture processing unit in a video coding system, the coding system comprising a layer is provided, the method comprising: a) providing a reference picture and a source picture, wherein both the reference picture and the source picture are from the same layer; b) filtering copies of the reference picture using at least one filter from the plurality of filters to obtain at least one filtered reference picture, wherein each filter is applied to a corresponding copy of the reference picture; c) performing disparity estimation based on the source picture and a full set or subset of the at least one filtered reference picture, wherein the disparity estimation is adapted to generate disparity information; d) obtaining distortion information based on the disparity information; and e) selecting the particular filter based on comparing the distortion information generated in step d), wherein the disparity information is a function of at least one of motion vectors, prediction distortion, intra prediction information, illumination parameters, luma components, chroma components, and tone mapping parameters.

According to a sixth embodiment of the disclosure, a filter selector adapted for selecting a particular filter from among a plurality of filters, the particular filter adapted for use in a reference processing unit in a multi-layered video coding system, the multi-layered video coding system comprising a base layer and one or more enhancement layers is provided, the filter selector comprising: a full set or subset of the plurality of filters for processing a reference picture or a region of the reference picture to obtain one or more processed reference pictures; and a disparity estimator adapted to generate disparity information based on an enhancement layer source picture and at least one processed reference picture from the one or more processed reference pictures, wherein the disparity information is a function of at least one of motion vectors, prediction distortion, intra prediction information, illumination parameters, luma components, chroma components, and tone mapping parameters, wherein the particular filter is selectable based on the disparity information.

According to a seventh embodiment of the disclosure, a filter selector adapted for selecting a particular filter from among a plurality of filters, the particular filter adapted for use in a reference processing unit in a multi-layered video coding system, the multi-layered video coding system comprising a base layer and one or more enhancement layers is provided, the filter selector comprising: a full set or subset of the plurality of filters for processing a reference picture or a region of the reference picture to obtain one or more processed reference pictures; and a disparity estimator adapted to generate disparity information based on an enhancement layer source picture and at least one processed reference picture from the one or more processed reference pictures, wherein the disparity information is a function of at least one of motion vectors, prediction distortion, intra prediction information, illumination parameters, luma components, chroma components, and tone mapping parameters; and a distortion information computation module adapted to generate distortion information based on the enhancement layer source picture and the at least one processed reference picture from the plurality of processed reference pictures, wherein the particular filter is selectable based on the distortion information.

According to an eighth embodiment of the disclosure, a filter selector adapted for selecting a particular filter from among a plurality of filters, the particular filter adapted for use in a reference processing unit in a multi-layered video coding system, the multi-layered video coding system comprising a base layer and one or more enhancement layers is provided, the filter selector comprising: a disparity estimator adapted to generate disparity information based on an enhancement layer source picture and motion information from a particular layer, wherein the disparity information is a function of at least one of motion vectors, prediction distortion, intra prediction information, illumination parameters, luma components, chroma components, and tone mapping parameters, intra prediction information, illumination parameters, and tone mapping parameters; and a distortion information computation module adapted to generate distortion information based on the enhancement layer source picture and the motion information from the particular layer, wherein the particular filter is selected based on the distortion information.

In multi-layered video codecs such as MVC, several encoding/decoding processes, depending on number of views, may be used in order to encode/decode a base layer and several enhancement layer image sequences, where each enhancement layer usually corresponds to a different view. For instance, several independent and dependent encoding/decoding processes may be used in combination in order to encode/decode different views. The independently coded views are typically called the base layer views while the dependently coded views are called the enhancement layer views.

FIG. 1 shows an implementation of a video codec system supporting at least a base layer (100) and an enhancement layer (110). In a particular implementation, a reconstructed output picture (120, 122) of a base layer encoder (102) and a base layer decoder (104) is inserted, along with temporal references (106, 116) of each layer (100, 110), into a reference picture buffer of an enhancement layer encoder (112) and an enhancement layer decoder (114), respectively, prior to encoding/decoding of the corresponding picture (120, 122) in the enhancement layer (110). This particular implementation enables the enhancement layer (110) to use both its own temporal references (116) as well as references (106) from a previously decoded layer for purposes such as motion estimation and compensation. In theory, if there is a high correlation between the images encoded (106, 116) in each layer (100, 110), the references (106) from the previous layer (100) can improve coding efficiency of the enhancement layer (110).

It should be noted that the video codec system implementation of FIG. 1 could also support additional layers (152, 154), where the additional layers also comprise corresponding encoders and decoders. In other words, the enhancement layer (110) shown in FIG. 1, which may also be called an inter-layer (among a plurality of other inter-layers) in such a multi-layer implementation, may provide enhancement layer references for use in subsequent enhancement layers (152, 154).

Figure 2:
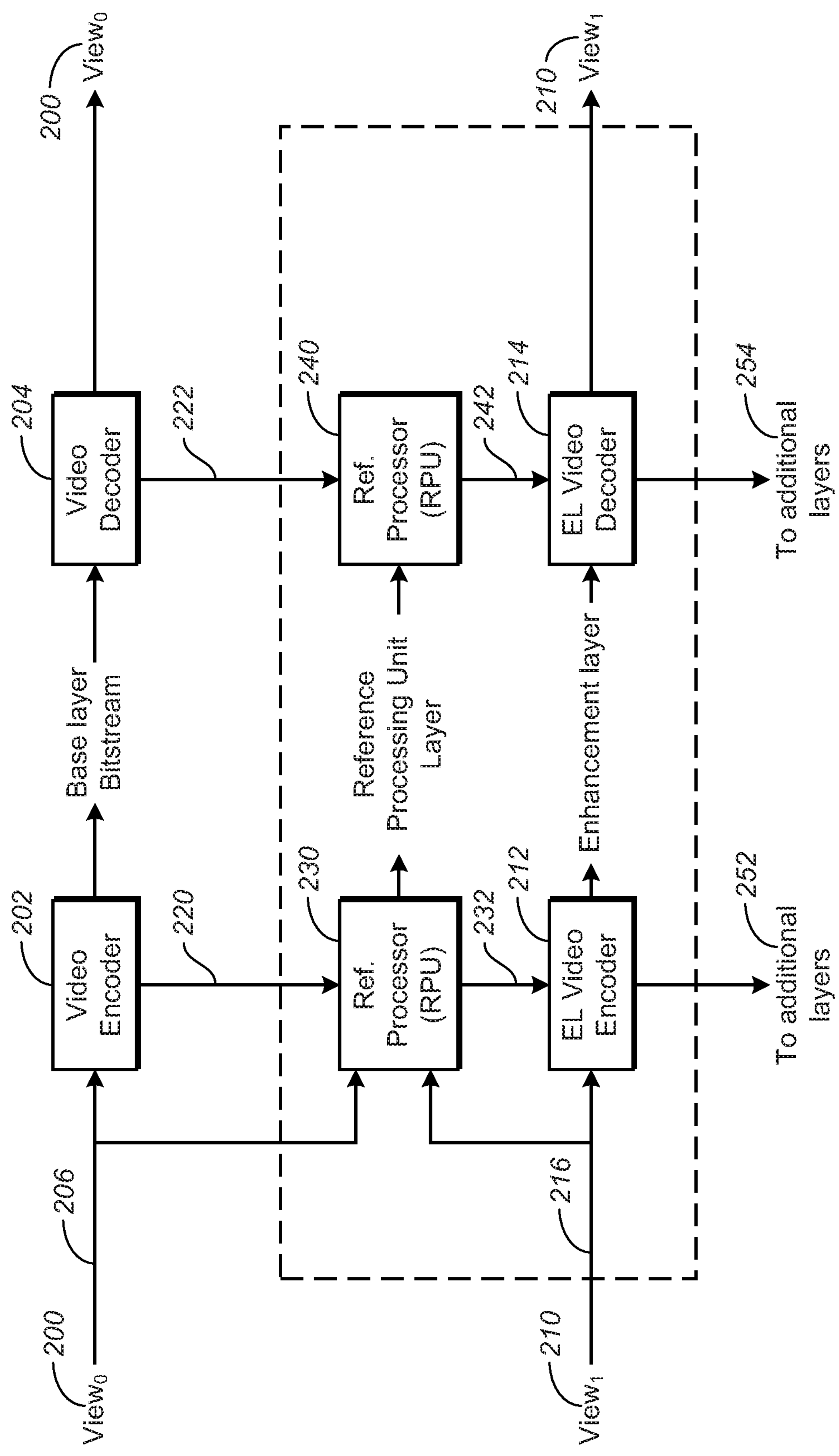
FIG. 2 shows an implementation of a multi-layered video codec system that utilizes reference processing.

FIG. 2 shows a second implementation of a system supporting at least a base layer (200) and an enhancement layer (210). In this implementation, a previous layer's references (206, 220, 222) are processed, prior to insertion into the enhancement layer's (210) reference picture buffer, using a Reference Processing Unit (RPU) (230, 240). The RPU (230, 240) derives a new reference picture (232, 242) for each corresponding layer that is generally better correlated with the enhancement layer source image (216) to be encoded than the case with no RPUs (230, 240) such as the implementation shown in FIG. 1. The better correlation generally yields better compression efficiency for the enhancement layer (210).

Similar to FIG. 1, the enhancement layer (210) may serve as an inter-layer for, and thus provide inter-layer references for, subsequent enhancement layers (252, 254). Consequently, an RPU may be used to derive new reference pictures based on references from one layer as well as references from previous layers.

Additional processing provided by the RPU (230) may, by way of example and not of limitation, involve linear/nonlinear filtering, motion transformation, motion compensation, illumination compensation, scaling, inverse and forward tone mapping, color format conversion, and gamma correction. The processing may be applied at a region-level on a reference picture, thereby enabling processing with methods of different characteristics to be used for different portions of the reference picture. Processing parameters can be derived in the encoder (202, 212), taking into account final reconstructed quality of an output video as well as available bandwidth and computing power, and then signaled to the decoder (204, 214). It should be noted that the term "processing", as used in this disclosure, is equivalent to the term "filtering". Consequently, processing on a reference picture may be performed by applying filters to the reference picture.

An exemplary reference that introduces enabling filters with different characteristics to be used for different portions of a reference picture is U.S. Provisional Application No. 61/170,995, entitled "Directed Interpolation and Post-Processing", filed on Apr. 20, 2009. Two exemplary references that introduce methods for adaptively deriving such filters based on content characteristics are U.S. Provisional Application No. 61/170,995, entitled "Directed Interpolation and Post-Processing", filed on Apr. 20, 2009, and U.S. Provisional Application No. 61/300,427, entitled "Adaptive Interpolation Filters for Multi-layered Video Delivery", filed on Feb. 1, 2010. Both these references are incorporated herein by reference in their entirety.

An application of the reference processing based architecture, such as shown in FIG. 2, is that of frame compatible full resolution delivery of 3D stereoscopic video. Frame compatible stereoscopic 3D delivery refers to delivery of stereoscopic content in which original left and right eye images are first downsampled, with or without filtering, to a lower resolution (typically half the original resolution) and then packed together into a single image frame (typically of the original resolution) prior to encoding. Many subsampling (e.g., horizontal, vertical, and quincunx) and packing (e.g., side-by-side, over-under, line-by-line, and checkerboard) methods are used for frame compatible stereoscopic video delivery.

Figure 3:
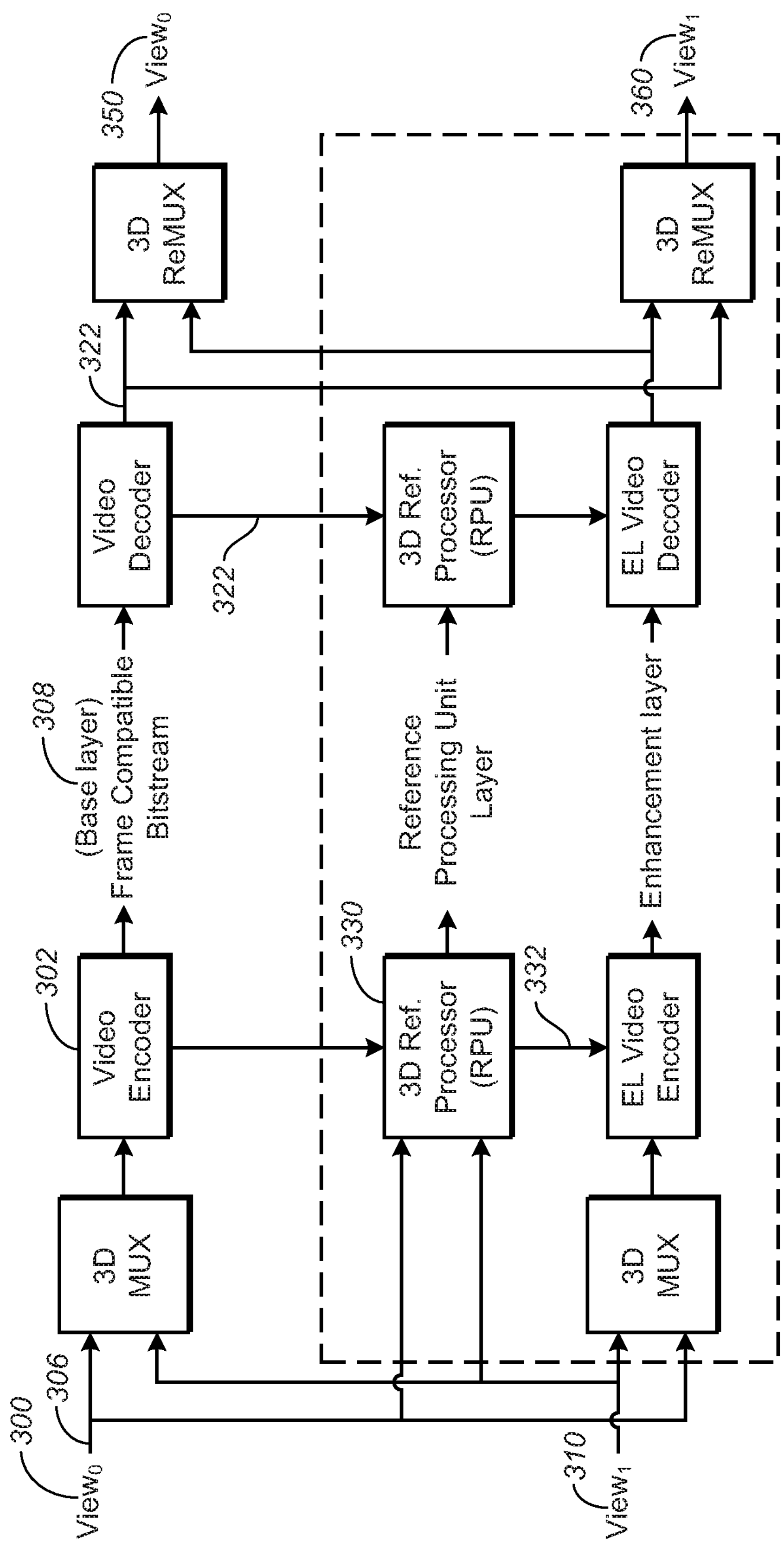
FIG. 3 shows an implementation of a frame compatible codec system.

FIG. 3 shows an implementation of a frame compatible full resolution 3D delivery architecture. This implementation encodes a base layer (300), or an inter-layer, as a frame compatible bitstream (308). Then, a reference processing unit (330) is used to process the base layer (306), or inter-layer reference, and generate a prediction (332) for an enhancement layer (310). The enhancement layer contains information that, when combined with base layer decoded images (322), as well as decoded images from other layers (not shown), generally improves resolution of final decoded left eye view (350) and right eye view (360).

Many embodiments of the present disclosure involve derivation of reference processing filters, generally for use within a reference processing unit of an encoder, that conform to the architecture presented in FIGS. 2 and 3. It should be noted that the encoder generally signals information pertaining to the RPU filter used in the encoder to a corresponding decoder. The decoder generally uses the signaled information to select its RPU filter. It should be noted that the signaling need not necessarily include specific filter coefficients. Instead, the encoder may signal a method by which the decoder is to derive the filter coefficients.

Figure 4A:
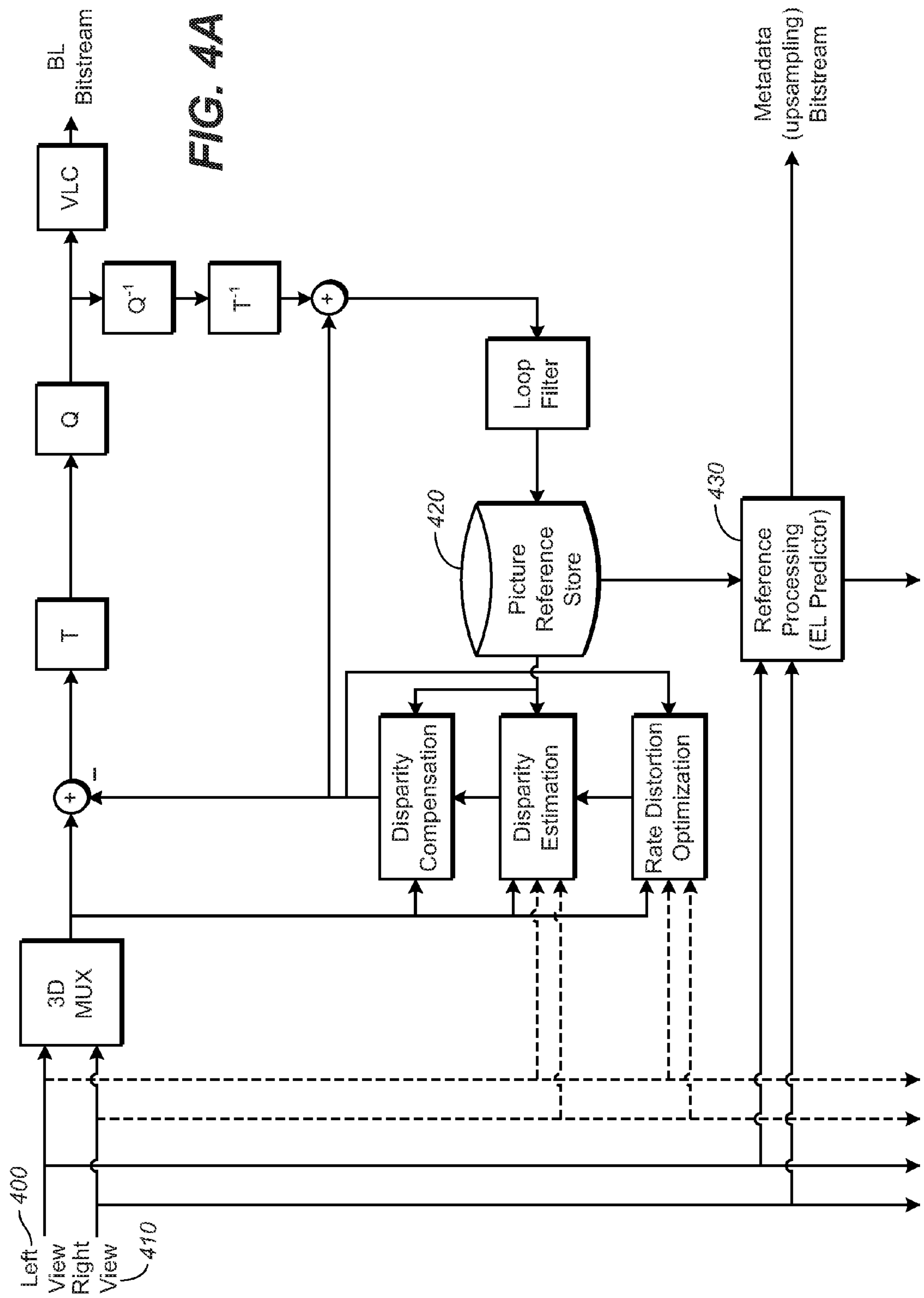
FIG. 4 shows an implementation of a frame compatible encoder.
Figure 4B:
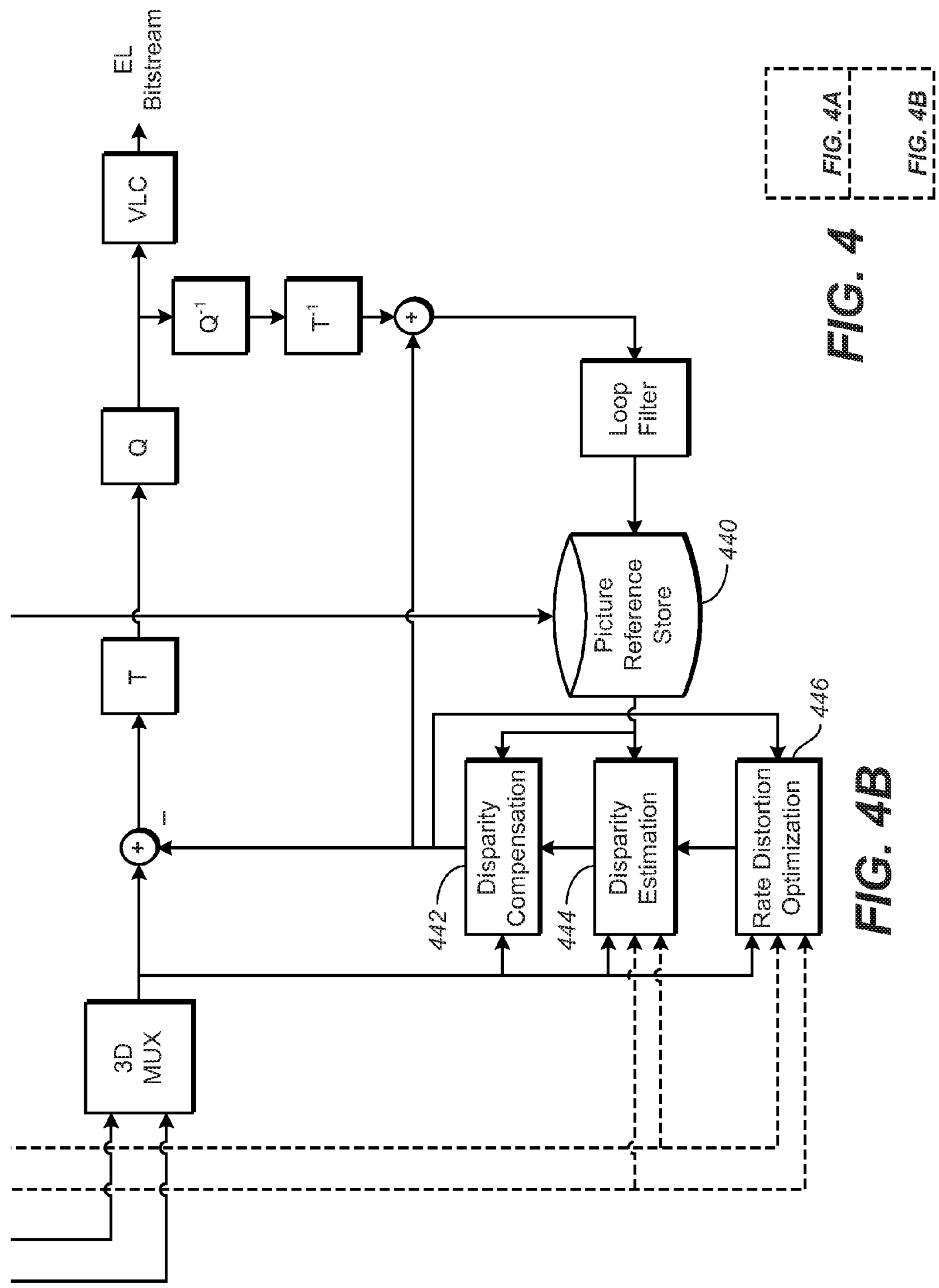

In embodiments involving application in stereoscopic video, the reference processing filters can be derived as shown in FIG. 4. In FIG. 4, a base layer reference picture from a base layer reference picture buffer (420) is provided as an input to an RPU (430). As in the case for previous figures, the input to the RPU (430) could also be, or include in addition to or instead of the base layer reference picture, reference pictures from other layers. In addition, left and right eye source images (400, 410) are also input into the RPU (430). An optimized filter selection (not shown) within the RPU (430) comprises comparing reference processed images or processed image regions from each filter to a source enhancement layer image (400, 410) and choosing the filters that provide optimal cost-distortion trade-off.

In one embodiment, the filter selection may be obtained using a Lagrangian optimization technique. By way of example and not of limitation, a Lagrangian optimization technique shown below in Equation (1) can be used to derive a filter based on cost-distortion criteria:

$$\min_f J_f = D_f + \lambda C_f, \tag{1}$$

where f denotes a filter index identifying the particular filter under consideration, $D_f$ denotes distortion in the reference processed image when compared to the source enhancement layer image, and $C_f$ denotes filter cost incurred due to use of filter f.

The distortion $D_f$ can be computed using a variety of techniques including sum of absolute or squared error between pixels, mean square error, PSNR, weighted sum of transformed square errors, sum of transformed absolute errors, SSIM, multiscale SSIM, and other perceptual image/video quality metrics. The cost $C_f$ is generally a function of number of bits used to signal the filter parameters. However, the cost may also be a function of other factors. For instance, in a power/complexity constrained application, the cost may also consider computational complexity and power requirements of applying the filter. In the case that the cost includes multiple factors including but not limited to number of bits, computational complexity, and power requirements, multiple lambda parameters may be used in order to separately tune influence of each factor on overall cost.

In the embodiment shown in FIG. 4, the filter selection process provided above is independent of motion/disparity estimation and mode decision process of an enhancement layer encoder. The mode decision process generally involves selecting an encoding mode for blocks or macroblocks (such as inter, intra, and skip blocks) to be used by the enhancement layer encoder. In FIG. 4, the mode decision process is based on the rate-distortion optimization (446). In other embodiments, the mode decision process may comprise, for instance, rate-distortion-complexity optimization. The enhancement layer encoder comprises a motion compensator (442), a motion estimator (444), and a rate distortion optimization module (446), which perform corresponding motion compensation (442), motion estimation (444), and rate distortion optimization (446) processes.

Specifically, the motion compensation (442), motion estimation (444), and rate distortion optimization (446) processes of the enhancement layer encoder are applied based on reference pictures from the enhancement layer reference picture buffer (440). As such, the processes (442, 444, 446) are applied using processed images from the base layer, or previous enhancement layers, as well as the temporal reference pictures from the enhancement layer reference picture buffer (440). In this embodiment, coding efficiency of the RPU filters (not shown) in the enhancement layer does not take into account the processes of motion compensation (442), motion estimation (444), and rate distortion optimization (446).

Figure 5:
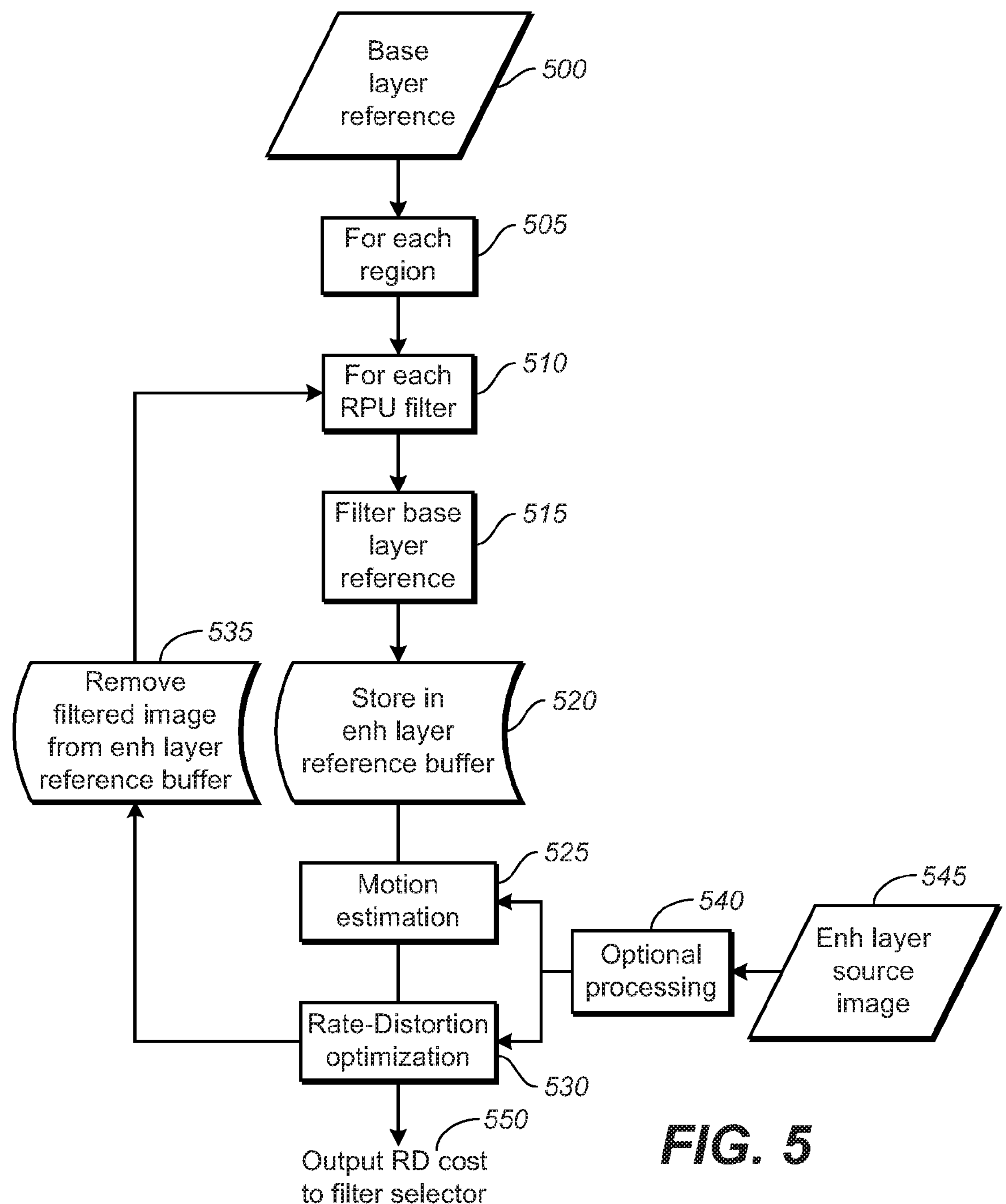
FIG. 5 shows an embodiment of a filter selection method.

FIG. 5 shows an embodiment of a filter selection process that takes into account motion estimation (525) and rate distortion optimization (530) processes of an enhancement layer encoder. The motion estimation (525) and rate distortion optimization (530) processes are performed using a motion estimator (525) and a rate distortion optimization module (530), respectively. In one embodiment, each region (505) of a previously encoded base layer picture (500), also referred to as a base layer reference picture, is filtered using each of possible filter (510) in an RPU (not shown) to obtain a filtered base layer reference picture (515). It should be noted that although the base layer is being specifically referred to, references or regions of references may also come from previous inter-layers and be filtered by filters in the RPU to obtain filtered inter-layer reference pictures. The filtered picture (515) or pictures are then inserted into an enhancement layer reference picture buffer (520). The enhancement layer encoder then performs motion/disparity estimation (525) and rate distortion optimization (530) on the filtered picture (515) based on the filtered base layer reference picture (515) and an enhancement layer source image (545).

In this embodiment, the motion estimation (525) and mode decision, which occurs along with the rate distortion optimization (530), of the enhancement layer encoder will use the filtered base layer picture (515) as a potential reference, in addition to other temporal reference pictures, and generate distortion and cost estimates of using a particular RPU filter (510). Factors that determine whether a potential reference is actually used as a reference picture may depend on, for instance, distortion, cost, and computational complexity that result from utilization of the potential reference.

The cost estimates may include, for instance, motion costs such as costs for signaling of motion vectors that refer to each reference picture as well as costs for encoding prediction residuals in addition to filter costs. Filter costs may include cost of signaling filter parameters such as filter types, filter coefficients, and so forth.

In one embodiment, the distortion may be computed using final reconstructed pixel values after motion compensation and coding of enhancement layer source images. After performing the motion estimation (525) and rate-distortion optimization (530) processes for each of the possible filters (510), the rate-distortion optimization (530) outputs rate-distortion cost to a filter selector (550), which selects one or more filters based on the rate-distortion cost. In some embodiments, one filter can be selected for each region of the base layer reference picture (500). Additionally, coding modes for an enhancement layer picture can be chosen, where the coding modes are used by the enhancement layer encoder to code blocks, macroblocks, and/or regions into the enhancement layer picture.

Subsequent to the rate-distortion optimization process (530), the filtered base layer picture (515) may be removed (535) from the enhancement layer reference buffer (520). In certain embodiments, the same filtered base layer picture (515) may be subsequently re-used in a case of multi-pass encoding or re-evaluated using different criteria.

Note that FIG. 5 describes a sequential scheme in which a single enhancement layer picture buffer (520) is used for the rate-distortion optimization (530) process. In another embodiment, a parallel scheme is also possible in which a plurality of enhancement layer reference picture buffers are generated to store each possible RPU filtered picture (515) prior to motion estimation and mode selection, such as mode selection based on rate-distortion optimization (530), at the enhancement layer encoder. It should be noted that each possible RPU filtered picture (515) could come from other enhancement layer reference picture buffers.

Additionally, in the embodiment shown in FIG. 5, the filter selection is based on the reconstructed base layer picture (515). In another embodiment, the filter selection can be performed using original non-encoded base layer, or alternatively inter-layer, images (500). Similarly, the original non-encoded enhancement layer images, which are used as the input source images (545) in the filter selection process, may or may not have been processed (540). Processing (540) may be performed, for instance, on the original non-encoded enhancement layer images to remove noise and improve the motion estimation process (525).

According to other embodiments of the present disclosure, the filter selection process can perform a single pass encoding and base the filter selection decision on the distortion between the filtered images (500) and the source images (545) and the cost of motion estimation and mode decision. Additionally, motion estimation may be performed on a subsampled image or a smaller region within the image to reduce computational complexity.

It should be noted that FIG. 5 may involve multi-pass encoding. Specifically, in various embodiments, the rate-distortion optimization process (530) may involve transforms and/or entropy coding as well as loop filtering. Consequently, the filtered references (515) may have been encoded multiple times during the filter selection process.

It should be noted that motion estimation (525) and rate distortion optimization (530) is used in this particular embodiment shown in FIG. 5. In other embodiments, the motion estimation (525) may be replaced with, for instance, a disparity estimation process performed by a disparity estimator whereas rate distortion optimization (530) may be replaced with, for instance, rate-distortion-cost optimization. Disparity information may include, by way of example and not of limitation, motion information (e.g., motion vectors and prediction distortion), intra prediction information, illumination parameters, luma components, chroma components, and tone mapping parameters. Also, each of the motion estimation and rate distortion optimization processes given in the following FIGS. 6-8 may also be replaced with, for instance, disparity estimation and rate-distortion-cost optimization processes.

Figure 6:
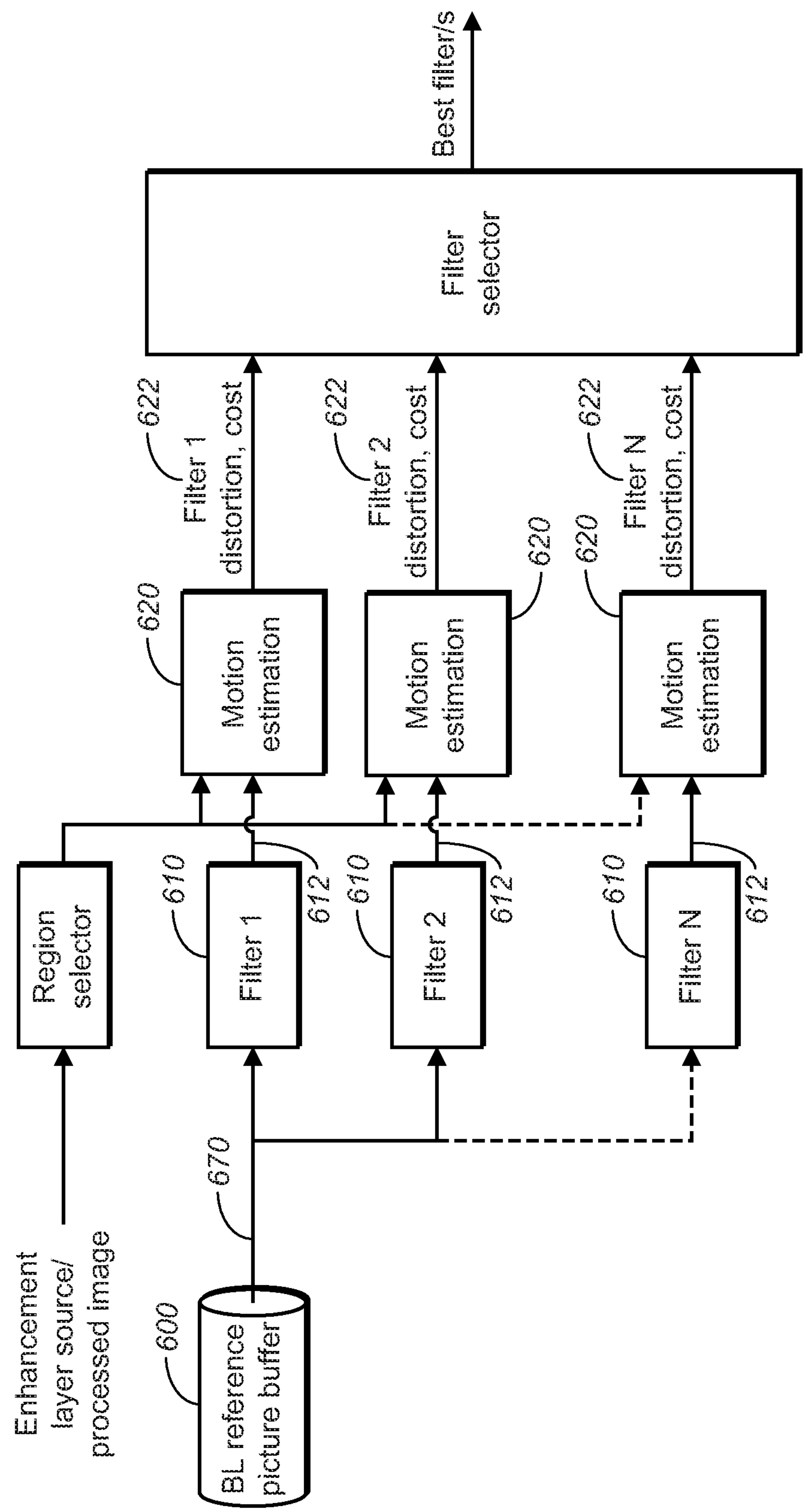
FIG. 6 shows an embodiment of a filter selection method that involves single pass encoding.

FIG. 6 shows an embodiment of a filter selection method that involves single pass encoding. This embodiment captures the effect of motion estimation/compensation on overall performance of an RPU. A base layer reference picture (670) from a base layer reference picture buffer (600) is utilized as an input to a plurality of filters (610). Each filter (610) outputs a filtered base layer reference picture (612). As previously mentioned, the embodiment need not involve the base layer and could instead involve an inter-layer. In this case, an inter-layer reference picture from a corresponding inter-layer reference picture buffer may be filtered to output filtered inter-layer reference pictures.

In the embodiment shown in FIG. 6, motion estimation (620) is performed on each filtered base layer or inter-layer reference (612) in order to obtain a prediction for an enhancement layer. The motion estimation (620) is performed using a motion estimator (620). The distortion and cost of applying each filter (610) is then computed. In some embodiments, the distortion quantifies, for instance, losses due to motion compensation processes and the cost takes into consideration, for instance, number of bits for signaling motion vectors and/or signaling filter parameters as well as computational complexity of the filter. The distortion and cost of each filter may be computed using a distortion computation module (622) and a cost computation module (622), respectively.

Note that in generating the cost associated with the motion estimation process (620), such as signaling of motion vectors, consideration can also be given to the possibility that motion vectors of a particular block may be predicted from the motion vectors of neighboring blocks. In one embodiment, block size used for the motion estimation process (620) can be chosen to be constant. In another embodiment, the block size can be chosen based on image characteristics such as edge features, texture, color, shape, and size of elements in the image under consideration. In yet another embodiment, in addition to the motion estimation process (620), a mode decision process (not shown) may also be performed in order to determine size and type of a block, illumination parameters, transformation parameters, quantization parameters, and so forth for each block.

Also, in one embodiment, the motion estimation may involve the luma and/or chroma components. In that case, the distortion may be computed based on distortion of one or more components or may include a combination of the motion estimated distortion of the one or more components and distortion assuming zero motion for other components (whether it be a luma component or other chroma components). In another embodiment, the motion estimation may be performed using only a subset of the components. The motion vectors derived from the subset of the components may be used to determine the motion estimated distortion of the other components. The distortion obtained from the different components may also be weighted differently for each component when obtaining the combined distortion over all the components.

Figure 7:
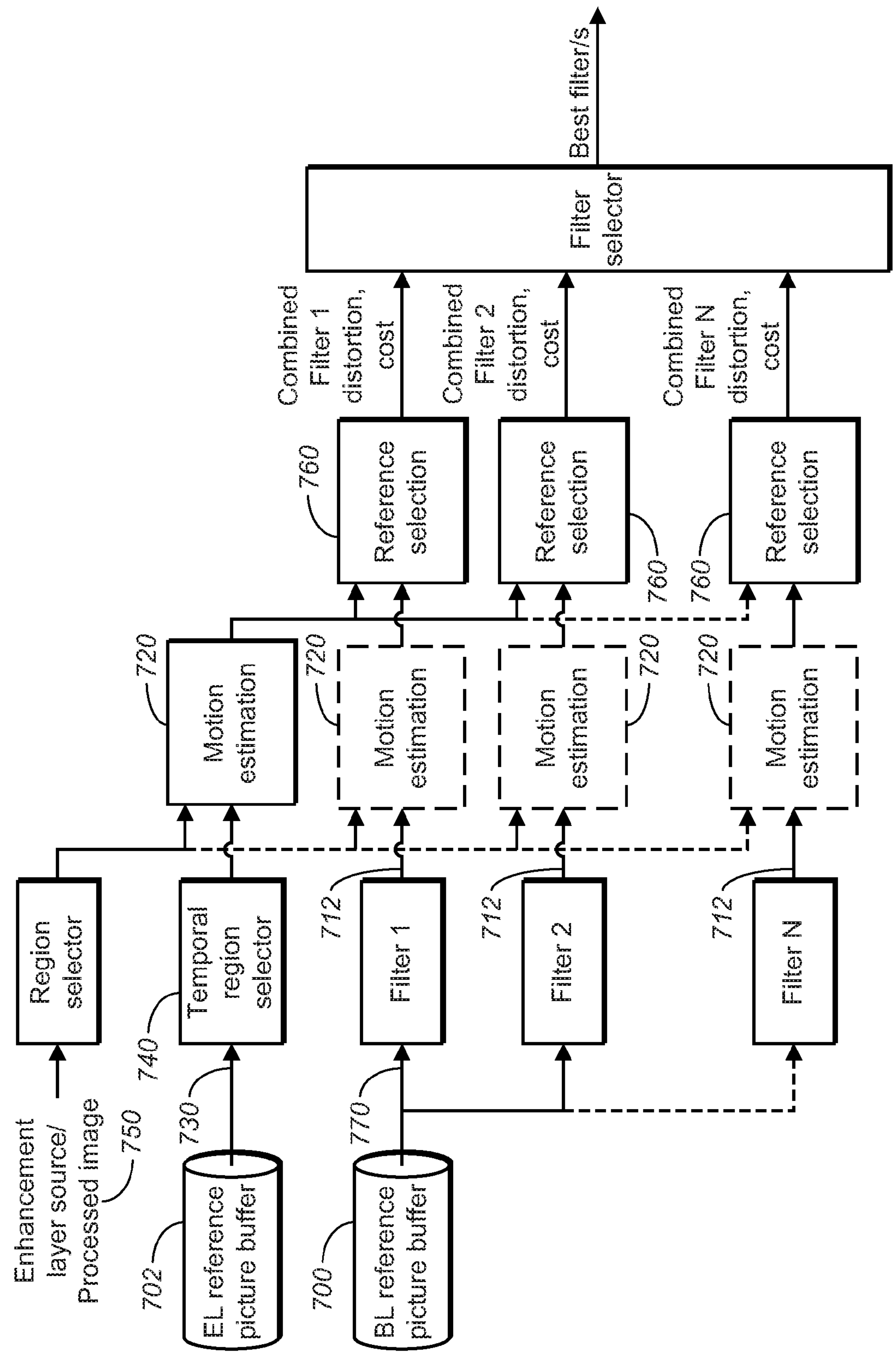
FIG. 7 shows an embodiment of a filter selection method that utilizes information from temporal references.

FIG. 7 shows an embodiment of a filter selection method that captures the effect of temporal references on the performance impact of an RPU on coding processes of video codec systems. In this embodiment, not all encoded blocks in an enhancement layer source picture (750) will use a filtered base layer reference picture (712), or a filtered reference picture from an inter-layer (not shown), as a reference. Some of the blocks may instead use temporal references from an enhancement layer picture buffer (702) while other blocks may be intra coded. In this embodiment, in addition to the filtered base layer, or inter-layer (not shown), reference pictures (712), enhancement layer temporal references (730) are also made available to the RPU at an enhancement layer encoder. By way of a motion estimator (720), the RPU can perform motion estimation (720) using all or some of the available references (712, 730) and a reference selector (760) will determine, for each block of the encoded picture (750), the reference picture (712, 730) that is likely to be used by the enhancement layer encoder. Additionally, the reference selector (760) determines motion vectors between the selected reference picture (712, 730) and the encoded picture as well as makes a mode decision.

In order to simplify the motion estimation (720) and mode decision processes, a smaller set of temporal references (730) from the enhancement layer picture buffer (702) than the ones actually available to the encoder may be selected in a temporal region selector (740), which may be designed to ignore less important temporal references (730). In one embodiment, the importance of the temporal references (730) may be determined based on a temporal distance from a current enhancement layer picture (750) to be encoded.

For example, assuming that the current picture (750) is at time t, only available references from time t−1 and t+1 may be used. In another embodiment, the importance of the temporal references (730) may be determined based on a correlation metric that determines correlation between each of the temporal references (730) in the reference picture buffer (702) and the current picture (750) to be encoded and only M most correlated temporal references will be used in RPU filter decision process, where M is an arbitrary number. Note that in the above embodiments, a bi-predictive or multi-hypothesis search may also be performed between the base layer filtered references (712) and the temporal references (730) in order to generate a more accurate prediction of a subsequent enhancement layer picture.

Figure 8:
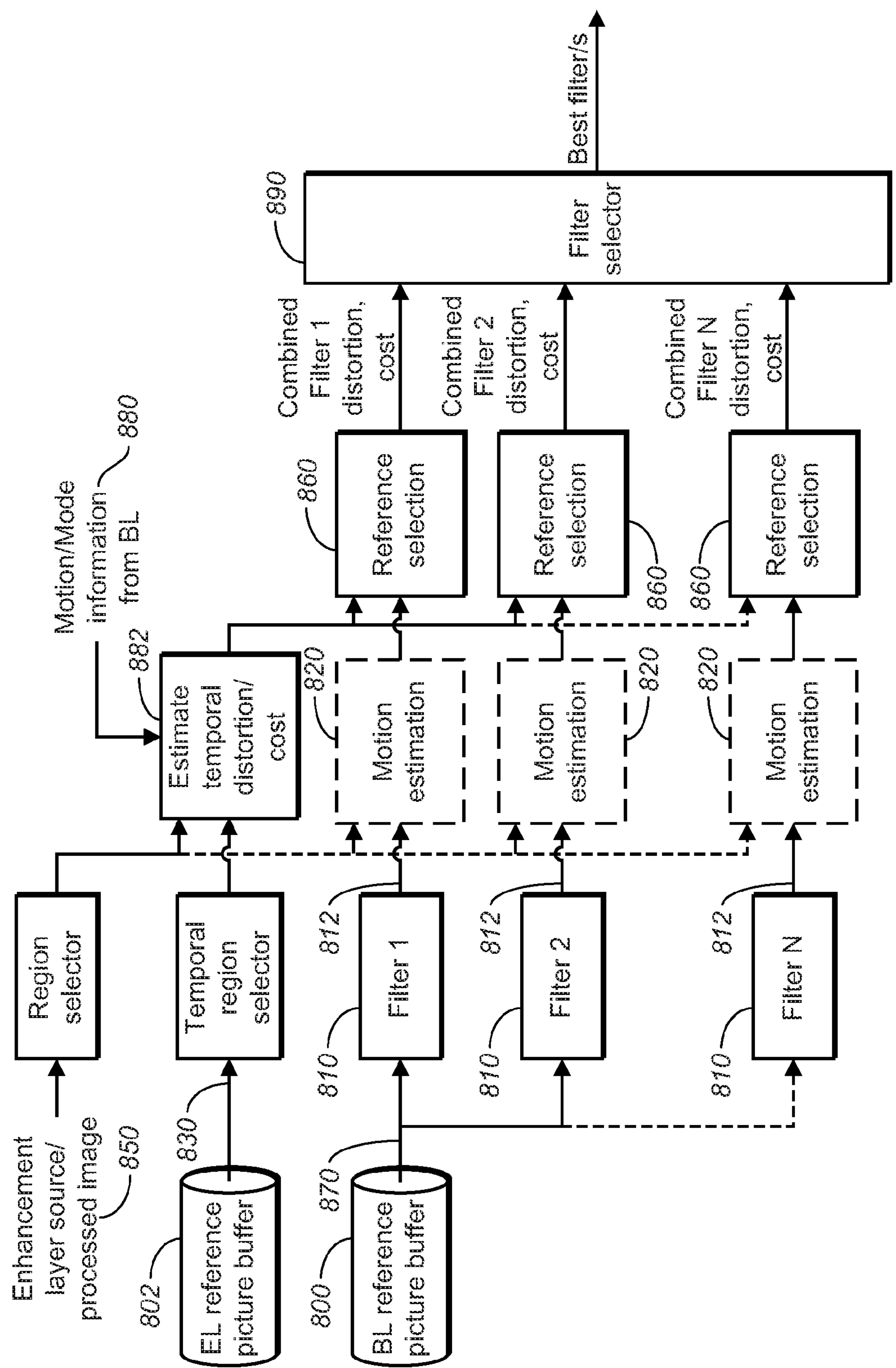
FIG. 8 shows an embodiment of a filter selection method that utilizes motion information from a base layer.

FIG. 8 shows an embodiment for a case where motion information from a base layer, or an inter-layer, is used in place of or in conjunction with enhancement layer temporal references. As previously mentioned on numerous accounts, although reference is made to the base layer, the base layer could also be one of a plurality of inter-layers. In order for the motion information from the base layer to be utilized in place of the enhancement layer temporal references, there is generally an implicit assumption that the motion information of the base layer and the enhancement layer pictures are highly correlated. In the case of high correlation, the motion vectors and/or mode decisions used for the base or inter-layer may also be used for the enhancement layer since the different layers share similar motion characteristics. Therefore, it is reasonable to expect that if there was no base or related inter-layer reference present in the enhancement layer, there would be high correlation between temporal motion vectors and/or mode decisions between the base or inter-layer and the current enhancement layers. Given this assumption, a temporal distortion/cost estimator in the enhancement layer can re-use the mode decisions and motion vectors from the base layer, in order to generate an estimate of temporal distortion and cost of predicting motion vectors and making mode decisions for the enhancement layer.

If a known relationship or transformation such as, for example, a change in spatial or temporal resolution, rotation, translation, etc., exists between the base and enhancement layer images, then the base layer information (880) such as motion vectors and mode decisions can be similarly transformed prior to using the motion vectors and mode decisions from the base layer to generate the estimates for the enhancement layer.

In another embodiment, the relation or transformation, applied on motion vectors of the base layer (or inter-layer) in order to derive the estimated motion vectors for the enhancement layer, may be determined based on the motion vectors derived in previously coded pictures or regions for the enhancement layer. Differences between the motion vectors of each layer in previously coded pictures can also be used as a guide to determine a confidence level in the motion estimates. Similarly, the distortion estimates obtained by re-using the motion vectors may be weighted by a confidence level of the distortion estimates. Given the temporal distortion and cost estimates, as well as the motion estimation results from filtered base layer references (812) (or inter-layer references), a reference selection (860) and mode decision (890) process can be performed that takes into account both the temporal references (830) and the filtered base layer references (812) (or inter-layer references) without necessarily increasing computational complexity of the filter selection process.

With continued reference to FIG. 8, the filter selection methods can be simplified by constraining the motion estimation process (820) to a lower complexity scheme. For example, in one embodiment, only integer pixel motion estimation is performed on the reference pictures (830, 870), which comprises the base layer reference pictures (830) or inter-layer reference pictures (not shown) and the enhancement layer temporal references (870). In another embodiment, sub-pixel accurate motion estimation (e.g., integer motion estimation followed by a sub-pixel refinement) may be performed on the reference pictures (830, 870) generated using a subset of a plurality of filters (810) or a subset of the temporal references (830), while integer pixel motion estimation is performed on the remaining references (830, 870). Such simplifications can reduce both computational complexity as well as memory requirements for the enhancement layer encoder.

In another embodiment, a motion search range may also be adapted based on filter type. Computational complexity of motion estimation can also be reduced by providing more accurate motion vector predictors, which may be derived from motion vectors, around which a motion search is performed. The motion vectors can be extracted from the base layer, inter-layers, or temporally from the enhancement layer itself. Spatial (intra prediction) may also be used. For example, with reference back to the embodiment of FIGS. 7 and 8, the motion estimation (720 in FIG. 7, 820 in FIG. 8) of the temporal reference pictures (730 in FIG. 7, 830 in FIG. 8) can be helped by providing motion vector predictors derived from the motion vectors or other prediction mode information such as intra prediction, in the encoded base layer of the corresponding picture. In this case, using these predictors as is, or performing an additional simple refinement of these predictors such as performing a small search range motion estimation, may be sufficient in lowering computational complexity.

In the case of the base layer filtered reference pictures (712, 812), the motion vector predictors can also be derived based on filter type used to generate the reference picture (712, 812). For example, one possible "filter" that can be used in the RPU is that of simply copying a base layer reference picture without any additional filtering. In this case, assuming there is a known phase offset between base and enhancement layer images, a motion vector predictor can be used that accounts for the phase offset. Additional reduction in computational complexity can also be obtained by reusing information from previously coded pictures, where the previously coded pictures could include temporal pictures and pictures from various layers. A number of techniques for reusing information from previously coded pictures for filter selection can be applied in this case.

According to some embodiments as shown in FIGS. 7 and 8, for each picture to be encoded in the enhancement layer, the RPU filter decision process will provide a map of the distortion and cost of using each RPU processed image (712, 812) as a reference as well as the distortion and cost of using a temporal reference (730, 830). The map may be used for selecting a filter for use in the RPU. Additionally, the map may also be used for performing a number of other encoder optimizations that further improve coding efficiency of the enhancement layer.

For example, encoding decisions generally made by the RPU may include determining number and shape of the regions over which a base layer reference picture (870) is divided prior to filtering. Since the cost of signaling the filter parameters increases with the number of regions, region sizes in the RPU are generally assigned to be larger than the block sizes used for motion estimation/compensation.

In one embodiment, by using the map of the filter distortion and cost as well as the temporal distortion and cost, the filter selection process can choose the region size to be equal to the size of a smallest contiguous set of blocks for which the selected filter remains the same.

In another embodiment, different region sizes and shapes may be tested in the filter selector (890) for both filter distortion and filter cost, and the best performing shape and size for a given distortion and/or cost criteria may be chosen. Additionally, edge detection may be performed on the base layer reference picture (770, 870) in order to determine the number and shape of the regions that are likely to be used by the enhancement layer encoder.

In another embodiment, the RPU may determine that use of the temporal references (730, 830) provides a more desirable trade-off between distortion and cost for an entire picture or a slice of the picture. Alternatively, the RPU may determine that use of the base layer filtered reference (770, 870) provides the more desirable trade-off. In either case, the RPU may signal to the enhancement layer encoder to modify ordering of the reference pictures (730, 770, 830, 870) within reference picture buffers (700, 702, 800, 802) such that more important references, given by the references (730, 770, 830, 870) that provide the more desirable distortion/cost trade-off, can be signaled using fewer bits than less important references. In other words, the more important references, which are used more frequently for prediction purposes than the less important references, are generally encoded such that the more important references take fewer bits to signal than the less important references. In another embodiment, if only the temporal references (830) are deemed to be sufficient, then the RPU can be disabled for the current picture to be encoded, saving both computational time and memory.

In conclusion, embodiments of the present disclosure provide a set of schemes for accomplishing filter selection of a filter for use in reference processing units in a multi-layered codec. Specifically, the selected filter may be used to provide a filtered previously coded layer picture, which is used as a reference picture for an enhancement layer. It should be noted, however, that similar principles can be applied in the case of a single layered codec. For instance, the single layered codec could use temporal references that may be used for prediction in the single layer. Prior to the prediction, the temporal references may be processed utilizing global or regional motion compensation, prefiltering, and so forth.

The methods and systems described in the present disclosure may be implemented in hardware, software, firmware, or combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

As described herein, an embodiment of the present invention may thus relate to one or more of the example embodiments that are enumerated in Table 1, below. Accordingly, the invention may be embodied in any of the forms described herein, including, but not limited to the following Enumerated Example Embodiments (EEEs) which described structure, features, and functionality of some portions of the present invention.

TABLE 1

| ENUMERATED EXAMPLE EMBODIMENTS |
| --- |
| EEE1. A method for selecting a particular filter from among a plurality of filters, the particular filter adapted for use in a reference picture processing unit in a multi-layered video coding system, the multi-layered video coding system comprising a base layer and one or more enhancement layers, the method comprising: |
| a) providing a reference picture and an enhancement layer source picture; |
| b) filtering copies of the reference picture using at least one filter from the plurality of filters to obtain at least one filtered reference picture, wherein each filter is applied to a corresponding copy of the reference picture; |
| c) performing disparity estimation based on the enhancement layer source picture and a full set or subset of the at least one filtered reference picture, wherein the disparity estimation is adapted to generate disparity information; and |
| d) selecting the particular filter based on comparing the disparity information generated in step c), |
| wherein the disparity information is a function of at least one of motion vectors, prediction distortion, intra prediction information, illumination parameters, luma components, chroma components, and tone mapping parameters. |
| EEE2. A method for selecting a particular filter from among a plurality of filters, the particular filter adapted for use in a reference picture processing unit in a multi-layered video coding system, the multi-layered video coding system comprising a base layer and one or more enhancement layers, the method comprising: |
| a) providing a reference picture and an enhancement layer source picture; |
| b) filtering copies of the reference picture using at least one filter from the plurality of filters to obtain at least one filtered reference picture, wherein each filter is applied to a corresponding copy of the reference picture; |
| c) performing disparity estimation based on the enhancement layer source picture and a full set or subset of the at least one filtered reference picture, wherein the disparity estimation is adapted to generate disparity information; |
| d) obtaining distortion information based on the disparity information; and |
| e) selecting the particular filter based on comparing the distortion information generated in step d), |
| wherein the disparity information is a function of at least one of motion vectors, prediction distortion, intra prediction information, illumination parameters, luma components, chroma components, and tone mapping parameters. |
| EEE3. A method for selecting a particular filter from among a plurality of filters, the particular filter adapted for use in a reference picture processing unit in a multi-layered video coding system, the multi-layered video coding system comprising a base layer and one or more enhancement layers, the method comprising: |
| a) providing an enhancement layer source picture; |
| b) performing disparity estimation based on the enhancement layer source picture and motion information from a particular layer, wherein the disparity estimation is adapted to generate disparity information; |
| c) obtaining distortion information based on the enhancement layer source picture and the motion information from the particular layer; and |
| d) selecting the particular filter based on comparing the distortion information acquired in step c), |
| wherein the disparity information is a function of at least one of motion vectors, prediction distortion, intra prediction information, illumination parameters, luma components, chroma components, and tone mapping parameters, and wherein the motion information from the particular layer is based on temporal reference pictures of the particular layer. |
| EEE4. A method for selecting a particular filter from among a plurality of filters, the particular filter adapted for use in a reference picture processing unit in a multi-layered video coding system, the multi-layered video coding system comprising a base layer and one or more enhancement layers, the method comprising: |
| a) providing a reference picture and an enhancement layer source picture; |
| b) filtering copies of the reference picture using at least one filter from the plurality of filters to obtain at least one filtered reference picture, wherein each filter is applied to a corresponding copy of the reference picture; |

TABLE 1-continued

| ENUMERATED EXAMPLE EMBODIMENTS |
|---|
| c) performing disparity estimation based on the enhancement layer source picture, a full set or subset of the at least one filtered reference picture, and motion information from a particular layer, wherein the disparity estimation is adapted to generate disparity information; |
| d) obtaining distortion information based on the enhancement layer source picture, the full set or subset of the at least one filtered reference picture, and motion information from the particular layer; and |
| e) selecting the particular filter based on comparing the distortion information acquired in step d), |
| wherein the disparity information is a function of at least one of motion vectors, prediction distortion, intra prediction information, illumination parameters, luma components, chroma components, and tone mapping parameters, and wherein the motion information is based on temporal reference pictures of the particular layer. |
| EEE5. A method for selecting a particular filter from among a plurality of filters, the particular filter adapted for use in a reference picture processing unit in a video coding system, the coding system comprising a layer, the method comprising: |
| a) providing a reference picture and a source picture, wherein both the reference picture and the source picture are from the same layer; |
| b) filtering copies of the reference picture using at least one filter from the plurality of filters to obtain at least one filtered reference picture, wherein each filter is applied to a corresponding copy of the reference picture; |
| c) performing disparity estimation based on the source picture and a full set or subset of the at least one filtered reference picture, wherein the disparity estimation is adapted to generate disparity information; |
| d) obtaining distortion information based on the disparity information; and |
| e) selecting the particular filter based on comparing the distortion information generated in step d), |
| wherein the disparity information is a function of at least one of motion vectors, prediction distortion, intra prediction information, illumination parameters, luma components, chroma components, and tone mapping parameters. |
| EEE6. The method of any one of Enumerated Example Embodiments 1-2 or 4-5, wherein the reference picture is not previously encoded prior to the step of filtering. |
| EEE7. The method of any one of Enumerated Example Embodiments 1, 2, or 4, wherein the reference picture is a base layer reference picture or an inter-layer reference picture, wherein an inter-layer is a layer from among the one or more enhancement layers. |
| EEE8. The method of any one of Enumerated Example Embodiments 1-2 or 4, wherein the reference picture is a spatial reference picture or a temporal reference picture from the enhancement layer. |
| EEE9. The method of any one of Enumerated Example Embodiments 1-4, 6, or 7, wherein the step of providing further comprises processing the enhancement layer source picture, wherein the processing removes noise in the enhancement layer source picture. |
| EEE10. The method of Enumerated Example Embodiment 5, wherein the step of providing further comprises processing the source picture, wherein the processing removes noise in the source picture. |
| EEE11. The method of any one Enumerated Example Embodiments 1-4 or 6-9, wherein the step of providing further comprises processing the enhancement layer source picture, wherein the processing involves applying at least one of filtering, motion transformation, motion compensation, illumination compensation, scaling, inverse and forward tone mapping, color format conversion, and gamma correction. |
| EEE12. The method of Enumerated Example Embodiment 5 or 10, wherein the step of providing further comprises processing the enhancement layer source picture, wherein the processing involves applying at least one of filtering, motion transformation, motion compensation, illumination compensation, scaling, inverse and forward tone mapping, color format conversion, and gamma correction. |
| EEE13. The method of any one of the preceding Enumerated Example Embodiments, wherein at least one of the filtered reference pictures is the reference picture. |
| EEE14. The method of Enumerated Example Embodiment 1, wherein the step of performing disparity estimation further comprises obtaining cost information for the at least one filter from among the plurality of filters used in the step of filtering, and wherein the step of selecting is further based on the cost information, wherein: |
| the cost information is a function of the disparity information, number of bits to be used in signaling filter parameters of each filter, number of bits to be used in signaling the motion vectors corresponding to each filtered reference picture, number of bits to be used in signaling the prediction distortion corresponding to each filtered reference picture, computational complexity in applying each filter, and power consumption of each filter. |
| EEE15. The method of Enumerated Example Embodiment 2, wherein the step of performing disparity estimation further comprises obtaining cost information for the at least one filter from among the plurality of filters used in step b), and wherein the step of selecting is further based on the cost information, wherein: |
| the cost information is a function of at least one of the disparity information, distortion between the enhancement layer source picture and each filtered reference picture, number of bits to be used in signaling filter parameters of each filter, number of bits to be used in signaling the motion vectors corresponding to each filtered reference picture, number of bits to be used in signalizing the prediction distortion corresponding to each filtered reference picture, computational complexity in applying each filter, and power consumption of the filter. |
| EEE16. The method of Enumerated Example Embodiment 3 or 4, wherein the step of obtaining distortion information further comprises obtaining cost information and the step of selecting is further based on the cost information, and wherein the cost estimation is a |

TABLE 1-continued

| ENUMERATED EXAMPLE EMBODIMENTS |
|---|
| function of at least one of number of bits to be used in signaling filter parameters of a full set or subset of filters in the plurality of filters, number of bits to be used in signaling the motion information from the particular layer, and power consumption of the full set or subset of filters in the plurality of filters. |
| EEE17. The method of any one of Enumerated Example Embodiments 2-4, wherein the obtaining distortion information is computed from the group consisting of sum of absolute or squared errors between pixels, mean square error, PSNR, weighted sum of transformed square errors, sum of transformed absolute errors, SSIM, and multiscale SSIM. |
| EEE18. The method of Enumerated Example Embodiment 1, further comprising, between the step of performing and the step of selecting, a step of performing disparity compensation on the enhancement layer source picture to obtain a final reconstructed picture, wherein the disparity compensation is based on the step of disparity estimation. |
| EEE19. The method of any one of Enumerated Example Embodiments 2-4, further comprising, between the step of disparity estimation and the step of distortion information, a step of performing disparity compensation on the enhancement layer source picture to obtain a final reconstructed picture, wherein the motion compensation is based on the step of disparity estimation. |
| EEE20. The method of Enumerated Example Embodiment 19, wherein the obtaining distortion information is further based on the final reconstructed picture. |
| EEE21. The method of any one of the preceding Enumerated Example Embodiments, wherein each of the steps is performed on regions of the reference picture. |
| EEE22. The method of Enumerated Example Embodiment 21, wherein the reference picture is decomposed using a plurality of region sizes and region shapes to obtain a plurality of reconstructed reference pictures, and wherein each of the steps are performed on the plurality of reconstructed reference pictures. |
| EEE23. The method of Enumerated Example Embodiment 22, wherein the region sizes and the region shapes are determined based on performing edge detection on the reference picture. |
| EEE24. The method of any one of the preceding Enumerated Example Embodiments, wherein the disparity estimation comprises block-based motion estimation. |
| EEE25. The method of Enumerated Example Embodiment 24, wherein motion vectors corresponding to a particular block are adapted to be predicted by motion vectors of blocks neighboring the particular block. |
| EEE26. The method of Enumerated Example Embodiment 24 or 25, wherein block size is based on image characteristics of the reference picture, wherein the image characteristics are a function of at least one of a luma component, a chroma component, and edge characteristics of the reference picture and texture, color, shape, and size of elements in the reference picture. |
| EEE27. The method of any one of Enumerated Example Embodiments 24-26, wherein the step of performing disparity estimation or the step of obtaining distortion information also determines at least one of block size and block shape. |
| EEE28. The method of any one of the preceding Enumerated Example Embodiments, wherein the performing disparity estimation comprises integer pixel motion estimation. |
| EEE29. The method of any one of Enumerated Example Embodiments 1-27, wherein the performing disparity estimation comprises sub-pixel accurate motion estimation. |
| EEE30. The method of Enumerated Example Embodiment 1, wherein the performing disparity estimation is further based on temporal reference pictures from an enhancement layer reference picture buffer. |
| EEE31. The method of any one of Enumerated Example Embodiments 2-4, wherein the performing disparity estimation is further based on temporal reference pictures from an enhancement layer reference picture buffer. |
| EEE32. The method of Enumerated Example Embodiment 31, further comprising, between the step of performing disparity estimation and the step of the obtaining distortion information, a step of selecting temporal reference pictures to be used in the step of obtaining distortion information. |
| EEE33. The method of Enumerated Example Embodiment 32, wherein the step of selecting temporal reference pictures is based on time difference between the temporal reference pictures and the enhancement layer source picture. |
| EEE34. The method of Enumerated Example Embodiment 33, wherein the step of selecting temporal reference pictures is based on correlation between each of the temporal reference pictures and the enhancement layer source picture. |
| EEE35. The method of any one of Enumerated Example Embodiments 31-34, further comprising a step of prioritizing importance of reference pictures, from high importance to low importance, based on comparing the cost information and the distortion information between the reference pictures to obtain a prioritized set of reference pictures. |
| EEE36. The method of Enumerated Example Embodiment 35, wherein fewer bits are used for signaling pictures in the prioritized set of reference pictures of higher importance than for pictures in the prioritized set of reference pictures of lower importance. |
| EEE37. The method of any one of Enumerated Example Embodiments 31-36, wherein sub-pixel accurate motion estimation is performed on a subset of the at least one filtered reference picture and a subset of the temporal reference pictures while integer pixel motion estimation is performed on remaining filtered reference pictures and remaining temporal reference pictures. |
| EEE38. The method of Enumerated Example Embodiment 35 or 36, wherein reference pictures of importance below a pre-defined threshold are not used in the step of obtaining distortion information. |
| EEE39. The method of Enumerated Example Embodiment 35 or 36, wherein the disparity estimation is performed at higher precision for reference pictures of higher importance and the disparity estimation is performed at lower precision for reference pictures of lower importance. |

TABLE 1-continued

| ENUMERATED EXAMPLE EMBODIMENTS |
|---|
| EEE40. The method of Enumerated Example Embodiment 3 or 4, wherein: motion information of the enhancement layer is based on the motion information from the particular layer, differences between the enhancement layer's motion information and the particular layer's motion information are used to compute a confidence level, and motion information comprises motion vectors and prediction distortion. |
| EEE41. The method of Enumerated Example Embodiment 40, wherein the distortion information is based on the differences between the enhancement layer's motion information and the particular layer's motion information, and the distortion information is weighted by the confidence level. |
| EEE42. The method of any one of the previous Enumerated Example Embodiments, wherein the disparity estimation is further based on one or more luma and chroma components. |
| EEE43. The method of Enumerated Example Embodiment 42, wherein the disparity estimation is further based on a subset of luma and chroma components, and wherein distortion of remaining luma and chroma components are computed based on the disparity information obtained from the subset of luma and chroma components. |
| EEE44. The method of Enumerated Example Embodiment 43, further comprising a plurality of weighting factors, wherein one weighting factor is applied to each luma component and each chroma component. |
| EEE45. The method of Enumerated Example Embodiment 3 or 4, wherein the motion information is based on at least one of motion vectors obtained from the particular layer, motion models used in the particular layer, and motion vectors from previously coded pictures of the particular layer or regions of the previously coded pictures of the particular layer. |
| EEE46. The method of any one of Enumerated Example Embodiments 1-2 or 4-5, wherein the step of providing comprises providing a plurality of reference pictures and the step of filtering is performed on a full set or subset of the plurality of reference pictures to obtain at least one filtered reference picture, and wherein each filter is applied to each reference picture of the full set or subset of the plurality of reference pictures. |
| EEE47. A filter selector adapted for selecting a particular filter from among a plurality of filters, the particular filter adapted for use in a reference processing unit in a multi-layered video coding system, the multi-layered video coding system comprising a base layer and one or more enhancement layers, the filter selector comprising: a full set or subset of the plurality of filters for processing a reference picture or a region of the reference picture to obtain one or more processed reference pictures; and a disparity estimator adapted to generate disparity information based on an enhancement layer source picture and at least one processed reference picture from the one or more processed reference pictures, wherein the disparity information is a function of at least one of motion vectors, prediction distortion, intra prediction information, illumination parameters, luma components, chroma components, and tone mapping parameters, wherein the particular filter is selectable based on the disparity information. |
| EEE48. A filter selector adapted for selecting a particular filter from among a plurality of filters, the particular filter adapted for use in a reference processing unit in a multi-layered video coding system, the multi-layered video coding system comprising a base layer and one or more enhancement layers, the filter selector comprising: a full set or subset of the plurality of filters for processing a reference picture or a region of the reference picture to obtain one or more processed reference pictures; and a disparity estimator adapted to generate disparity information based on an enhancement layer source picture and at least one processed reference picture from the one or more processed reference pictures, wherein the disparity information is a function of at least one of motion vectors, prediction distortion, intra prediction information, illumination parameters, luma components, chroma components, and tone mapping parameters; and a distortion information computation module adapted to generate distortion information based on the enhancement layer source picture and the at least one processed reference picture from the plurality of processed reference pictures, wherein the particular filter is selectable based on the distortion information. |
| EEE49. The filter selector of Enumerated Example Embodiment 47 or 48, further comprising a cost information computation module adapted to generate cost information, wherein the cost information is a function of at least one of distortion between the enhancement layer source picture and the at least one filtered reference picture, number of bits to be used in signaling filter parameters of each filter, number of bits to be used in signaling the motion vectors corresponding to each filtered reference picture, number of bits to be used in signaling the prediction distortion corresponding to each filtered reference picture, computational complexity in applying each filter, and power consumption of the filter. |
| EEE50. A filter selector adapted for selecting a particular filter from among a plurality of filters, the particular filter adapted for use in a reference processing unit in a multi-layered video coding system, the multi-layered video coding system comprising a base layer and one or more enhancement layers, the filter selector comprising: a disparity estimator adapted to generate disparity information based on an enhancement layer source picture and motion information from a particular layer, wherein the disparity information is a function of at least one of motion vectors, prediction distortion, intra prediction information, illumination parameters, luma components, chroma components, and tone mapping parameters, intra prediction information, illumination parameters, and tone mapping parameters; and a distortion information computation module adapted to generate distortion information based on the enhancement layer source picture and the motion information from the particular layer, wherein the particular filter is selected based on the distortion information. |

TABLE 1-continued

| ENUMERATED EXAMPLE EMBODIMENTS |
|---|
| EEE51. The filter selector of any one of Enumerated Example Embodiments 47-50, wherein the particular filter is selected based on the disparity information and temporal reference pictures from an enhancement layer reference picture buffer. |
| EEE52. The filter selector of Enumerated Example Embodiment 51, further comprising a reference selector that selects the temporal reference pictures for use in selecting the particular filter. |
| EEE53. The filter selector of Enumerated Example Embodiment 52, wherein the reference selector prioritizes the temporal reference pictures based on comparing the disparity information and the cost information of the temporal reference pictures. |
| EEE54. The filter selector of Enumerated Example Embodiment 48 or 50, wherein the distortion information computation module computes the distortion information using the group consisting of sum of absolute or squared errors between pixels, mean square error, PSNR, weighted sum of transformed square errors, sum of transformed absolute errors, SSIM, and multiscale SSIM. |
| EEE55. A filter selector for selecting a particular filter from among a plurality of filters, the particular filter adapted for use in a reference processing unit, according to the method recited in any one of the preceding Enumerated Example Embodiments. |
| EEE56. A reference processing unit comprising a plurality of filters and the filter selector of Enumerated Example Embodiment 55, wherein the filter selector selects a particular filter from the plurality of filters for use in the reference processing unit. |
| EEE57. A computer-readable storage medium containing a set of instructions that causes a computer to perform the method recited in any one of Enumerated Example Embodiments 1-46. |
| EEE58. An encoder for encoding a video signal comprising a reference processing unit, wherein the reference processing unit selects a filter based on the method recited in any one of Enumerated Example Embodiments 1-46. |

Furthermore, all patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the reference processing filter selection methods of the disclosure, and are not intended to limit the scope of what the inventors regard as their disclosure. Modifications of the above-described modes for carrying out the disclosure may be used by persons of skill in the video art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method for selecting a particular filter from among a plurality of filters, the particular filter adapted for use in a reference picture processing unit in a multi-layered video coding system, the multi-layered video coding system comprising a base layer and one or more enhancement layers, the method comprising:

a) providing (i) an enhancement layer source picture, and (ii) a reference picture from the base layer or an inter-layer, the inter-layer being a layer from among the one or more enhancement layers that is processed prior to the enhancement layer of the enhancement layer source picture;

b) dividing the reference picture into regions, wherein the region sizes and the region shapes are determined based on performing edge detection on the reference picture, and wherein each of the following steps is performed on the regions of the reference picture:

c) filtering copies of the reference picture using at least one filter from the plurality of filters to obtain at least one filtered reference picture, wherein each filter is applied to a corresponding copy of the reference picture;

d) performing disparity estimation based on the enhancement layer source picture, a full set or subset of the at least one filtered reference picture, temporal reference pictures from an enhancement layer reference picture buffer, and motion information from the base layer or an inter-layer, the inter-layer being a layer from among the one or more enhancement layers that is processed prior to the enhancement layer of the enhancement layer source picture, and wherein the disparity estimation is adapted to generate disparity information;

e) selecting a set of temporal reference pictures from the enhancement layer reference picture buffer;

f) obtaining distortion information based on the disparity information and the selected set of temporal reference pictures; and g) selecting the particular filter based on comparing the distortion information generated in step f); wherein:

the disparity information comprises a function of at least one of motion vectors, prediction distortion, intra prediction information, illumination parameters, luma components, chroma components, and tone mapping parameters, motion information of the enhancement layer is based on the motion information from the base layer or the inter-layer, differences between the motion information of the enhancement layer and the motion information from the base layer or the inter-layer are used to compute a confidence level, the distortion information is based on the differences between the motion information of the enhancement layer and the motion information from the base layer or the inter-layer, and the distortion information is weighted by the confidence level.

2. The method as recited in claim 1, wherein the step of providing further comprises processing the enhancement layer source picture, wherein the processing involves applying at least one of filtering, motion transformation, motion compensation, illumination compensation, scaling, inverse and forward tone mapping, color format conversion, and gamma correction.

3. The method as recited in claim 1, wherein the step of performing disparity estimation further comprises obtaining cost information for the at least one filter from among the plurality of filters used in the step of filtering, and wherein the step of selecting the particular filter is further based on the cost information; and wherein the cost information is a function of the disparity information, distortion between the enhancement layer source picture and each filtered reference picture, number of bits to be used in signaling filter parameters of each filter, number of bits to be used in signaling the motion vectors corresponding to each filtered reference picture, number of bits to be used in signaling the prediction distortion corresponding to each filtered reference picture, computational complexity in applying each filter, and power consumption of the filter.

4. The method as recited in claim 1, further comprising, between the step of disparity estimation and the step of obtaining distortion information, a step of performing disparity compensation on the enhancement layer source picture to obtain a final reconstructed picture, wherein the disparity compensation is based on the step of disparity estimation.

5. The method as recited in claim 4, wherein the obtaining distortion information is further based on the final reconstructed picture.

6. The method as recited in claim 1, wherein the disparity estimation comprises block-based motion estimation.

7. The method as recited in claim 1, wherein the step of selecting temporal reference pictures is based on a respective time difference between the temporal reference pictures and the enhancement layer source picture.

8. The method as recited in claim 7, wherein the step of selecting temporal reference pictures is based on a respective correlation between each of the temporal reference pictures and the enhancement layer source picture.

9. The method as recited in claim 1, further comprising a step of prioritizing importance of reference pictures, from high importance to low importance, based on comparing the cost information and the distortion information between the reference pictures to obtain a prioritized set of reference pictures.

10. The method as recited in claim 9, wherein fewer bits are used for signaling pictures in the prioritized set of reference pictures of higher importance than for pictures in the prioritized set of reference pictures of lower importance.

11. The method as recited in claim 1, wherein sub-pixel accurate motion estimation is performed on a subset of the at least one filtered reference picture and a subset of the temporal reference pictures while integer pixel motion estimation is performed on remaining filtered reference pictures and remaining temporal reference pictures.

12. The method as recited in claim 9, wherein reference pictures of importance below a pre-defined threshold are not used in the step of obtaining distortion information.

13. The method as recited in claim 9, wherein the disparity estimation is performed at higher precision for reference pictures of higher importance and the disparity estimation is performed at lower precision for reference pictures of lower importance.

14. A system for selecting a particular filter from among a plurality of filters, the particular filter adapted for use in a reference picture processing unit in a multi-layered video coding system, the multi-layered video coding system comprising a base layer and one or more enhancement layers, the system comprising:

a) means for providing (i) an enhancement layer source picture, and (ii) a reference picture from the base layer or an inter-layer, the inter-layer being a layer from among the one or more enhancement layers that is processed prior to the enhancement layer of the enhancement layer source picture;

b) means for dividing the reference picture into regions, wherein the region sizes and the region shapes are determined based on performing edge detection on the reference picture, and wherein each of the following means is configured to perform the respective action on the regions of the reference picture:

c) means for filtering copies of the reference picture using at least one filter from the plurality of filters to obtain at least one filtered reference picture, wherein each filter is applied to a corresponding copy of the reference picture;

d) means for performing disparity estimation based on the enhancement layer source picture, a full set or subset of the at least one filtered reference picture, temporal reference pictures from an enhancement layer reference picture buffer, and motion information from the base layer or an inter-layer, the inter-layer being a layer from among the one or more enhancement layers that is processed prior to the enhancement layer of the enhancement layer source picture, and wherein the disparity estimation is adapted to generate disparity information;

e) means for selecting a set of temporal reference pictures from the enhancement layer reference picture buffer;

f) means for obtaining distortion information based on the disparity information and the selected set of temporal reference pictures; and g) means for selecting the particular filter based on comparing the distortion information generated with the distortion information obtaining means f) and based on the divided regions of each filtered reference picture; wherein:

the disparity information comprises a function of at least one of motion vectors, prediction distortion, intra prediction information, illumination parameters, luma components, chroma components, and tone mapping parameters, motion information of the enhancement layer is based on the motion information from the base layer or the inter-layer, differences between the motion information of the enhancement layer and the motion information from the base layer or the inter-layer are used to compute a confidence level, the distortion information is based on the differences between the motion information of the enhancement layer and the motion information from the base layer or the inter-layer, and the distortion information is weighted by the confidence level.

15. A non-transitory computer readable storage medium, comprising instructions that are tangibly encoded therewith, which when executed with a processor, cause the processor to cause, control, program or configure, at least in part, a process for selecting a particular filter from among a plurality of filters as recited in claim 1.

* * * * *